US007793402B2

(12) United States Patent
Barringer et al.

(10) Patent No.: US 7,793,402 B2
(45) **Date of Patent: *Sep. 14, 2010**

(54) METHOD FOR FASTENING TWO SUBSTANTIALLY COPLANAR EDGES WITHOUT A WELD

(75) Inventors: Dennis R. Barringer, Wallkill, NY (US); Buddy D. Notohardjono, Poughkeepsie, NY (US); Justin C. Rogers, Poughkeepsie, NY (US); Harold M. Toffler, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 159 days.

This patent is subject to a terminal disclaimer.

(21) Appl. No.: 12/143,906

(22) Filed: Jun. 23, 2008

(65) Prior Publication Data

US 2008/0250627 A1 Oct. 16, 2008

Related U.S. Application Data

(63) Continuation of application No. 10/853,425, filed on Oct. 18, 2004, now Pat. No. 7,404,252.

(51) Int. Cl.
*B21D 39/00* (2006.01)
*B23P 11/00* (2006.01)

(52) U.S. Cl. ............................ 29/505; 29/432; 29/830; 29/844; 29/861; 29/871; 83/29; 83/35; 83/36; 83/50; 439/894

(58) Field of Classification Search ................ 29/592.1, 29/432, 505, 830, 844, 861, 871, 872; 83/29, 83/35, 36, 50; 439/894
See application file for complete search history.

(56) References Cited

U.S. PATENT DOCUMENTS

| | | | | |
|---|---|---|---|---|
| 3,678,725 | A | 7/1972 | Langewis | |
| 4,976,008 | A | 12/1990 | Baer | |
| 5,525,065 | A | 6/1996 | Sobhani | |
| 5,775,060 | A * | 7/1998 | Ferrero | 53/453 |
| 5,974,937 | A * | 11/1999 | Doughty et al. | 86/49 |
| 6,246,548 | B1 | 6/2001 | Williams | |
| 6,430,809 | B1 | 8/2002 | Bauer | |
| 6,450,842 | B1 | 9/2002 | Matsuda | |

* cited by examiner

*Primary Examiner*—Paul D Kim
(74) *Attorney, Agent, or Firm*—Cantor Colburn LLP; Gerry Monteleone

(57) ABSTRACT

A method for fastening two substantially coplanar edges without a weld. The method includes: configuring a dovetail feature on a first edge; configuring a complementary dovetail feature receptacle on a second edge to receive the dovetail feature therein; disposing the dovetail feature within the complementary dovetail receptacle; and swaging an interface defined between the dovetail feature in said first edge and said complementary dovetail feature in the second edge to swage mating edges defining the dovetail feature and the dovetail receptacle at at least six swage contact points.

6 Claims, 6 Drawing Sheets

METHOD FOR FASTENING TWO SUBSTANTIALLY COPLANAR EDGES WITHOUT A WELD

CROSS REFERENCE TO RELATED APPLICATION

This application is a continuation application of U.S. application Ser. No. 10/853,425 filed Oct. 18, 2004, now U.S. Pat. No. 7,404,252 to which U.S. application Ser. No. 11/834,918, filed Apr. 15, 2008, now U.S. Pat. No. 7,357,682 claims the benefit of priority, the disclosure of which is incorporated by reference herein in its entirety.

FIELD OF THE INVENTION

The present invention relates generally to a method and apparatus for fastening two coplanar edges without a weld and more specifically to a method and apparatus for fastening a docking cassette for printed circuit boards that eliminates use of a spot or fillet weld and a resulting burn mark thus eliminating touch-up to coat the welded area.

BACKGROUND OF THE INVENTION

As integrated circuit (IC) and printed circuit board (PCB) design and fabrication techniques become more sophisticated, computer system design techniques must also become more sophisticated. This is because as IC's and PCB's become more densely populated, their performance capabilities and speeds increase and computer systems which employ these IC's and PCB's must be able to support the increase in performance. In addition, as businesses that employ these computer systems and components become more sophisticated, they demand greater performance from their computer systems resulting in increasingly densely populated PCB's and computer systems having tightly packed packages. As a result of these tightly packed packages, these PCB's and computer systems are susceptible to a variety of problems which must be considered.

In order to increase decorative appearance of packaging while providing denser packages, it has become necessary to eliminate a weld pad area such as spot and fillet welds. Elimination of a weld pad area allows the use of pre-plated materials in areas where customers have a clear view without burn marks typically associated with a weld pad area. Furthermore, by eliminating burn marks, an additional costly touch-up process to coat the welded area is eliminated For example, it is known to join complimentary configured dovetailed edges using a "cross" patterned swage across an interface thereof to join mating dovetail edges without a spot or fillet weld. The "cross" patterned swage forms three edge swaging contact points. However, this process appears to work only for light loads and small applications.

Accordingly, a method and apparatus for fastening two coplanar edges without using welding and touch-up processes that creates a stronger bond for use with heavier loads and/or larger applications is desired.

SUMMARY OF THE INVENTION

A method and apparatus for fastening two substantially coplanar edges without a weld is disclosed. The method and apparatus include configuring a dovetail feature on a first edge and configuring a complementary dovetail feature receptacle on a second edge to receive the dovetail feature therein. The dovetail feature is disposed within the complementary dovetail receptacle and an interface defined between the dovetail feature in said first edge and said complementary dovetail feature in the second edge is swaged to swage mating edges defining the dovetail feature and the dovetail receptacle at least six swage contact points. In one embodiment the swaging is with a hollow circle punch.

In another embodiment, a docking apparatus includes a cassette housing defining a housing cavity for one of a printed circuit board and allowing air flow therethrough; a dovetail feature configured on a first edge defining the cassette housing; a complementary dovetail feature receptacle configured on a second edge defining the cassette housing to receive the dovetail feature therein, the dovetail feature being disposed within the complementary dovetail receptacle; and a swaged interface defined between the dovetail feature in the first edge and the complementary dovetail receptacle in the second edge, the swaged interface mating edges defining the dovetail feature and the dovetail receptacle at least six swage contact points. In an exemplary embodiment the swaging is with a hollow circle punch.

BRIEF DESCRIPTION OF THE DRAWINGS

Referring now to the figures, which are exemplary embodiments, and wherein the like elements are numbered alike.

DETAILED DESCRIPTION OF THE INVENTION

Figure 1:
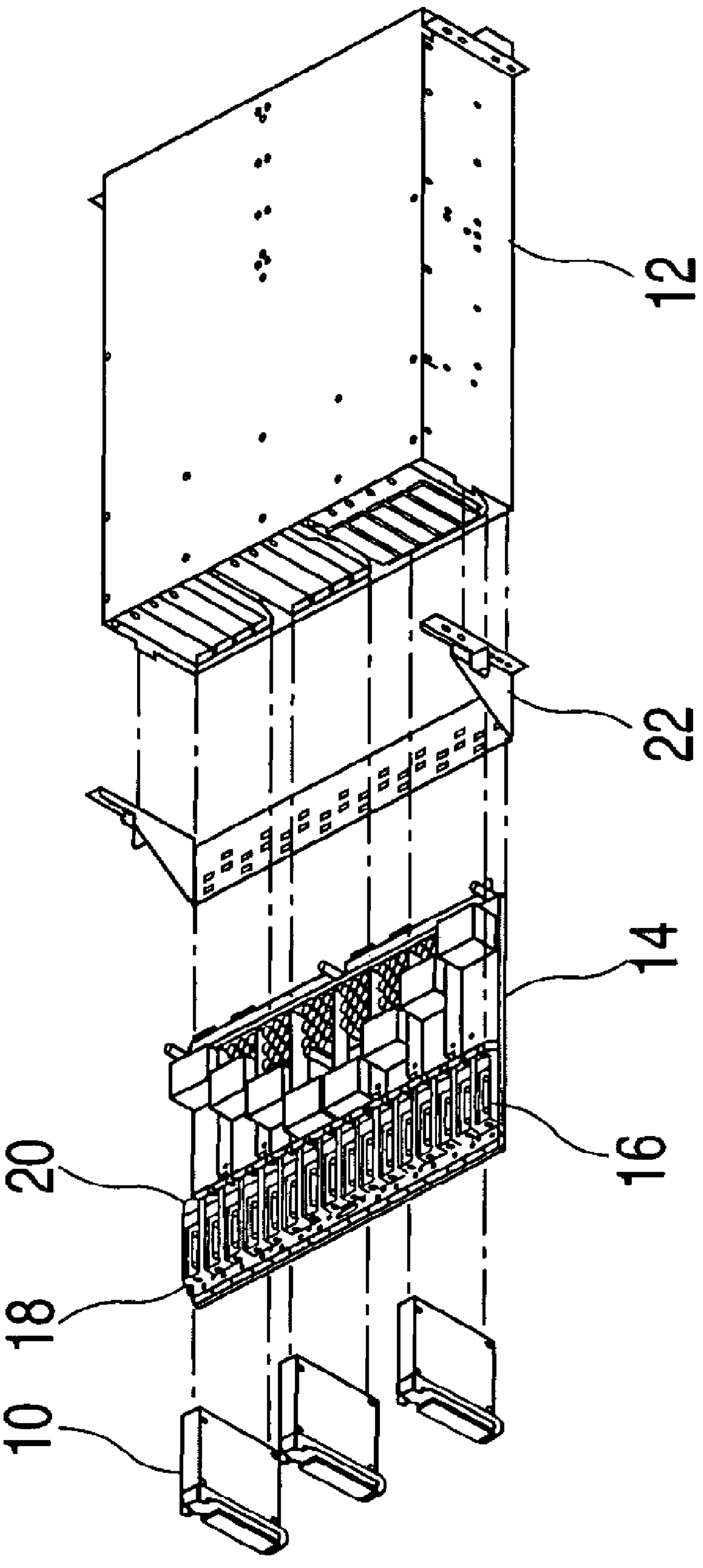
FIG. 1 is an exploded overall view of a docking cassette and a computer system in accordance with an embodiment of the invention.

Referring generally to the FIG. 1, a docking apparatus or cassette 10 for mounting a printed circuit card (PCC) into a computer system 12 is shown, in accordance with an embodiment of the invention. Docking apparatus 10 preferably provides structural support to the PCC so as to allow for the easy insertion and removal of the PCC from computer system 12, as well as thermal and electrical isolation from other PCC's and components within the computer system.

Docking cassette 10 is disposed onto a computer system main board 14 or main printed circuit board (PCB) having a PCB connector receptacle 16, a first receptacle 18 and a second receptacle 20. Docking cassette 10 is preferably disposed onto computer system main board 14 such that a PCB connector is adjacent to PCB connector receptacle 16. In addition, main board 14 is slidably engaged with a cable tray 22 for releasably supporting and securing computer system 12 in a system rack (not shown)

Figure 2:
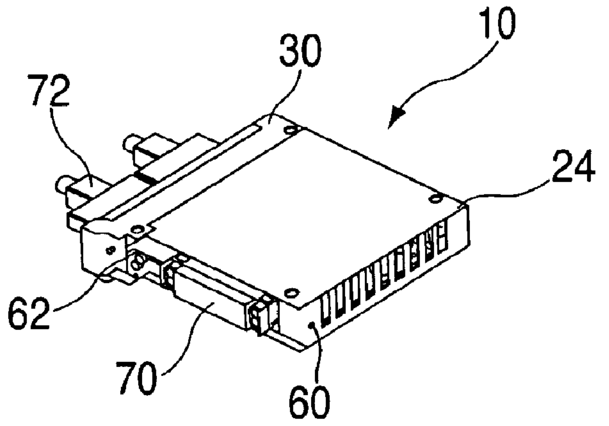
FIG. 2 is a perspective view of a docking cassette in accordance with an embodiment of the invention.
Figure 3:
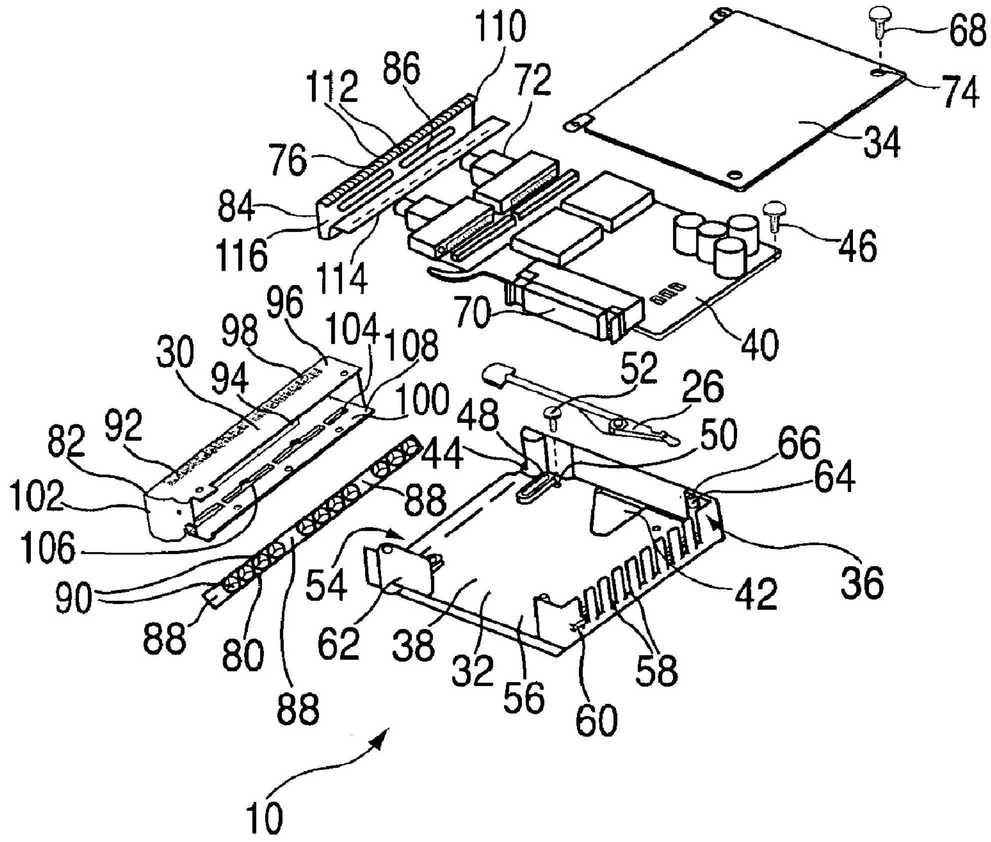
FIG. 3 is an exploded view of a docking cassette in accordance with an embodiment of the invention.

Referring to FIGS. 2 and 3, docking apparatus 10 for mounting to a printed circuit board (PCB) in computer system 12 is shown, in accordance with an embodiment of the invention. Docking apparatus 10 preferably includes a cassette housing 24, a linkage mechanism 26 and a housing bezel 30. Cassette housing 24 preferably includes a housing base 32, a housing cover 34 and a housing wall 36, wherein housing base 32 and housing wall 36 are non-movably associated with each other and disposed relative to each other so as to define a housing cavity 38 for movably containing a PCC 40.

In accordance with an exemplary embodiment, housing base 32 preferably includes a linkage cavity 42 and four mounting devices 44 for movably holding PCC 40. PCC 40 preferably includes a PCC mounting mechanism 46 and mounting device 44 preferably includes a device opening 48 for slidingly containing PCC mounting mechanism 46, wherein PCC mounting mechanism 46 may be a screw, a pin or any mounting mechanism suitable to the desired end purpose. In addition, housing base 32 preferably includes a linkage mounting receptacle 50 for associating linkage mechanism 26 with housing base 32. In accordance with an exemplary embodiment, although linkage mounting receptacle 50 is preferably a receptacle opening for receiving a linkage mounting screw 52, linkage mounting receptacle 50 may be any receptacle device suitable to the desired end purpose, such as a clip receptacle. In accordance with an exemplary embodiment, it is considered within the scope of the disclosure that PCC 40 may be movably associated with housing base 32 using any device or method suitable to the desired end purpose, such as a screw or pin.

Housing wall 36 preferably includes a cable opening 54, a PCB connector opening 56 and a plurality of vent openings 58. In addition, housing wall 36 preferably includes a first protrusion 60 and a second protrusion 62, wherein first protrusion 60 and second protrusion 62 are disposed so as to lockingly engage with main board 14 of computer system 12. In accordance with an embodiment of the invention, first protrusion 60 and second protrusion 62 are shown as being disposed on housing wall 36. However, it is considered within the scope of the invention that first protrusion 60 and second protrusion 62 may be disposed anywhere on cassette housing 24 in a manner suitable to the desired end purpose. Moreover, housing wall 36 preferably includes at least one mounting structure 64 which defines a threaded cavity 66 for receiving a mounting apparatus 68, such as a screw. In addition, PCB connector opening 56 and cable opening 54 are preferably disposed so as to allow communication with the PCB connector 70 and the PCC cable connections 72 when PCC 40 is disposed within housing cavity 38.

Housing cover 34 preferably includes at least one cover opening 74 disposed so as to allow communication with mounting structure 64 when housing cover 34 is associated with housing wall 36. Cover opening 74 is preferably disposed so as to allow mounting apparatus 68 to communicate with threaded cavity 66 for removably securing housing cover 34 with housing wall 36. Although an exemplary embodiment describes housing cover 34 being removably secured with housing wall 36, it is considered within the scope of the disclosure that housing cover 34 may also be removably secured with housing base 32 and/or housing wall 36 using any mounting device or method suitable to the desired end purpose.

Referring now to FIG. 3, housing bezel 30 preferably includes an inner tail-stock bezel 76, an EMC gasket 80 and an outer tail-stock bezel 82. Inner bezel 76 preferably includes a forward bezel wall 84 having at least one forward opening 86. EMC gasket 80 preferably includes a plurality of apertures 88 disposed along a length defining gasket 80 and plurality of retaining clips 90 extending from an edge of gasket 80 for attachment to a flange extending from inner bezel 76 described more fully below having apertures aligned with apertures 88 of gasket 80 for venting air therethrough. Outer tail-stock bezel 82 preferably includes a tail-stock front 92 having a tail-stock front opening 94 and a tail-stock wall 96 having a tail-stock top 98, a tail-stock bottom 100 and a tail-stock side 102. In accordance with an embodiment of the invention, tail-stock front 92 and tail-stock wall 96 are preferably non-movably associated with each other so as to form a tail-stock cavity 104, discussed more fully herein below in accordance with an exemplary embodiment. In addition, tail-stock bottom 100 preferably includes at least one flanged opening 106. Tail-stock top 98 also preferably includes at least one tail-stock mounting hole 108 for mounting housing bezel 30 to cassette housing 24.

Still referring now to FIG. 3, inner tail-stock bezel 76 includes a flange 110 extending from forward bezel wall 84. Flange 110 includes apertures 112 disposed in a length thereof for allowing air to pass therethrough. Retaining clips 88 extending from an edge defining a surface of EMC gasket 80 are configured to clip onto flange 110 such that apertures 90 of gasket 80 are aligned with apertures 112 disposed along flange 110. Inner bezel 76 further includes a mounting lip 114 extending from an opposite edge of wall 84 in the same direction and substantially parallel to flange 110. Mounting lip 114 is configured to mount PCC 40 in an offset position within docking apparatus 10 so that a bottom surface of PCC 40 is not positioned against housing base 32.

Figure 4:
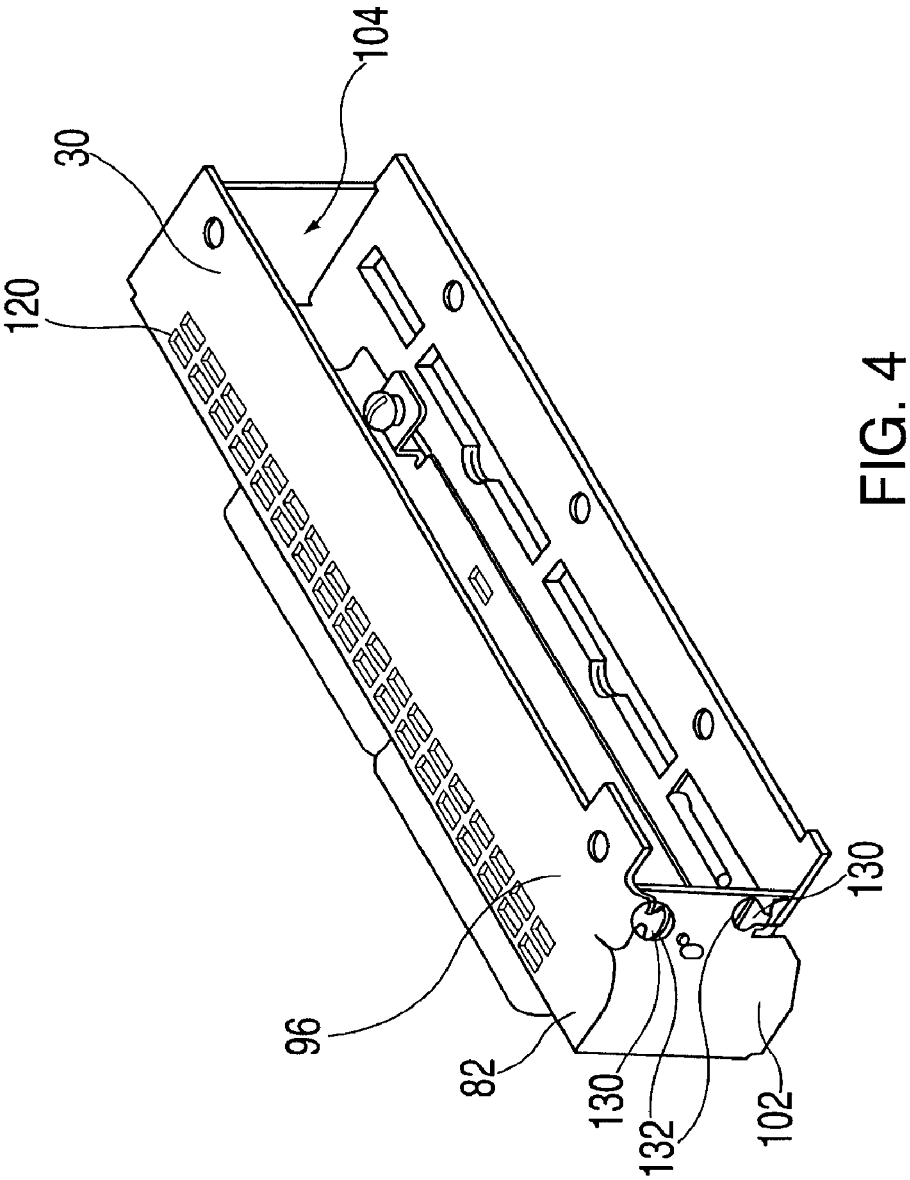
FIG. 4 is a perspective view of a housing bezel disposed on the docking cassette of FIG. 3 illustrating mating dovetails with a circle swage providing six contact points therebetween in accordance with an exemplary embodiment.

Referring now to FIGS. 3 and 4, inner bezel 76 having EMC gasket 80 coupled thereto is disposed within tail-stock cavity 104 such that apertures 90 of gasket 80 and apertures 112 of inner bezel are aligned with vents 120 configured in tail-stock wall 96 of outer tail sock bezel 82. In a preferred embodiment, apertures 90 and 112 align with two rows of vents 120 for allowing air to flow therethrough. The two rows of vents 120 is best seen in FIG. 4.

Referring now to FIG. 4 and in accordance with an exemplary embodiment of the disclosure, tail-stock walls 96 and 102 are non-movably associated with each other so as to form a tail-stock cavity 104 by engaging corresponding dovetail features 130 to form a swage interface therebetween. More specifically, after joining respective dovetail features defining edges of mating tail-stock walls 96, 102, a hollow circle punch (not shown) is used to swage the interface therebetween imprinting a circle 132 thereover and provide six swage contact points 136 therebetween as best seen with reference to FIG. 6.

Figure 5:
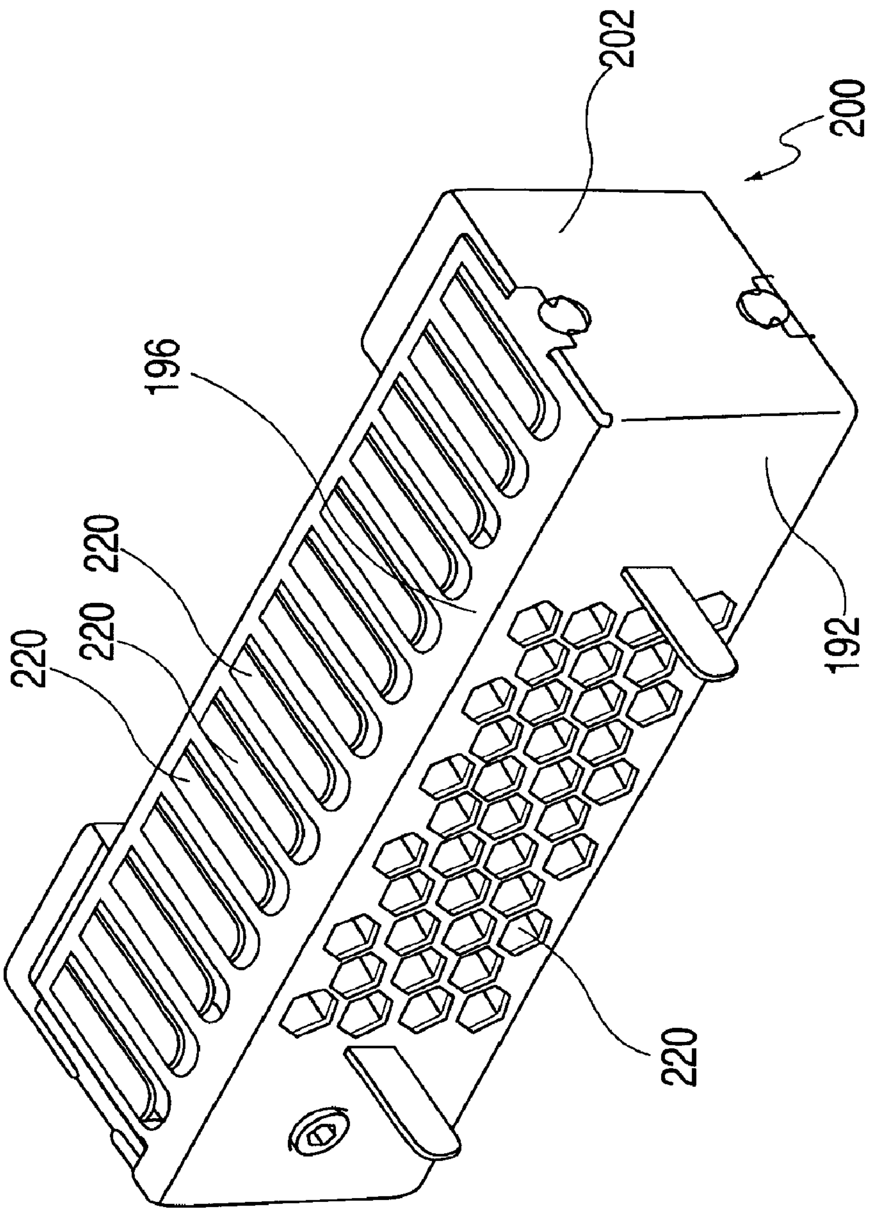
FIG. 5 is a perspective view of an alternative exemplary embodiment of an air flow filler book in place of the docking cassette of FIG. 2 illustrating mating dovetails with a circle swage providing six contact points therebetween in accordance with an exemplary embodiment.

Referring now to FIG. 5, an alternative exemplary embodiment of forming a weldless connection between dovetail features is illustrated with respect to an air flow filler book assembly 200. Air flow filler book assembly 200 is used in place of docking cassette 10 to fill a card slot space in computer system 12 while allowing air flow through vents 220 configured in a tail stock front 192 and opposing tail stock walls 196 of assembly 200.

Figure 6:
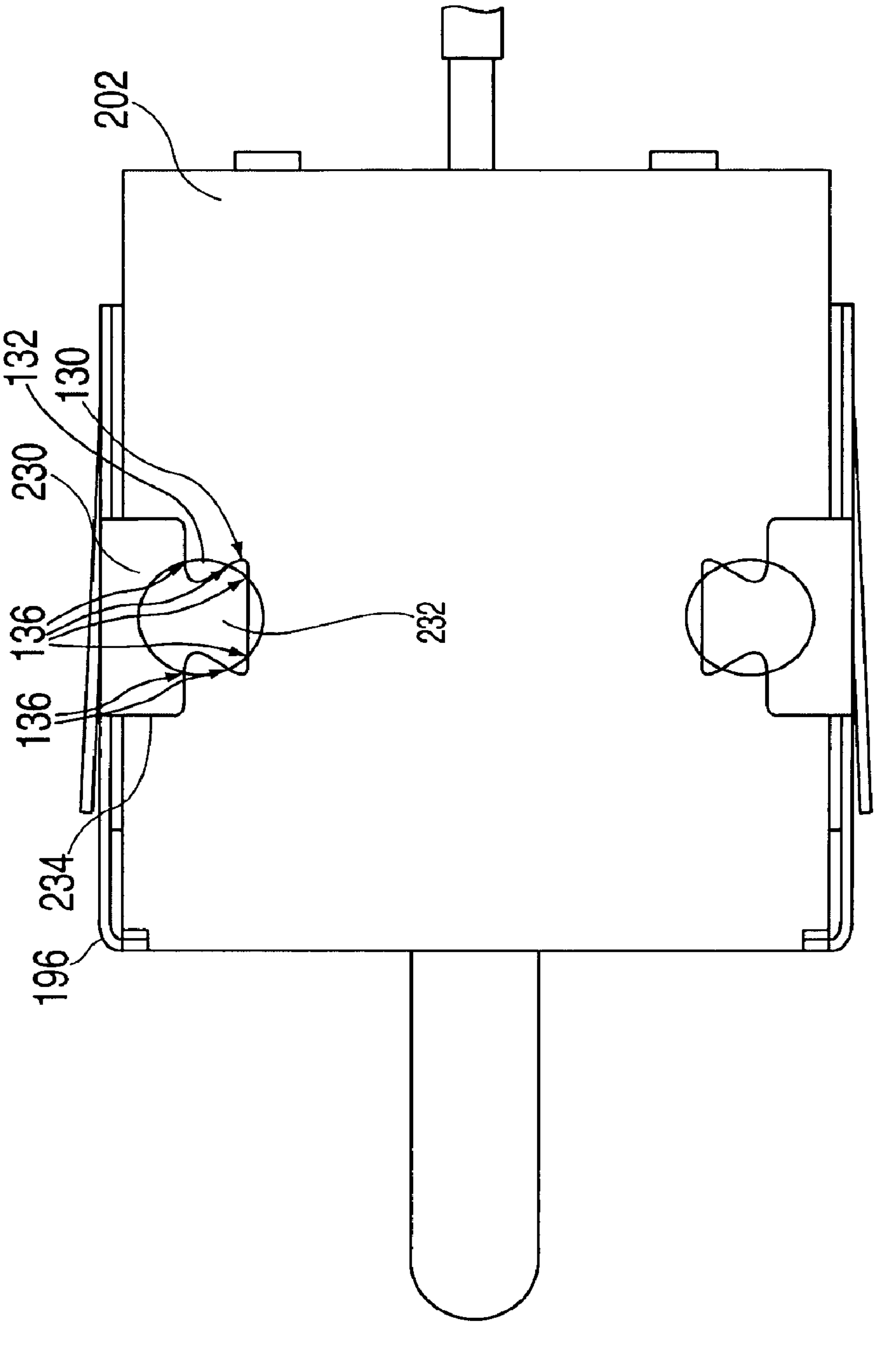
FIG. 6 is an enlarged side view of FIG. 5 illustrating the mating dovetails having the circle swage providing the six contact points therebetween in accordance with an exemplary embodiment.

Referring now to FIG. 6, an enlarged side view of assembly 200 of FIG. 5 is illustrated showing six swaging contact points 136 across dovetail features 130 as a result of punching circle 132 thereover. Complementary configured dovetail features 130 include a pair of dovetails 232 each configured in an outboard end of a flange 230 extending from opposite walls 196 and each bent substantially normal thereto towards each other and coplanar with a side wall 202. Side wall 202 includes a pair of opposing complementary dovetail receptacles 234 configured to receive a corresponding dovetail 232 therein. A hollow circle punch (not shown) is aligned over the mating dovetail features 130 provided by interfacing dovetails 232 and respective receptacles 234 and is provided a force to swage an interface therebetween. Six swage contact points 136 result from the swage corresponding to a profile of the hollow circle punch intersecting an interface between dovetails 232 and corresponding receptacles 234.

Figure 7:
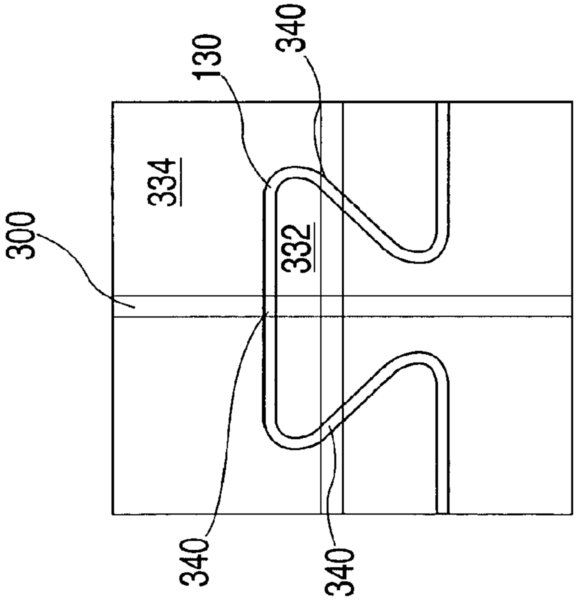
FIG. 7 is a partial view of the mating dovetails of FIG. 5 swaged with a conventional cross pattern punch profile illustrating three swage contact points across an interface of the mating dovetails.
Figure 8:
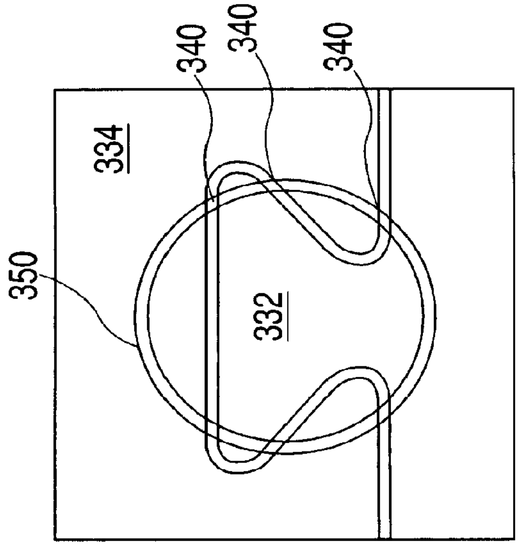
FIG. 8 is a partial view of the mating dovetails of FIG. 5 swaged with a circle punch profile illustrating six swage contact points across the interface of the mating dovetails.
Figure 9:
FIG. 9 is a partial view of an alternative embodiment of mating dovetails of FIG. 8 being ovalized and swaged with a circle punch profile illustrating six swage contact points across the interface of the mating dovetails.
Figure 9:
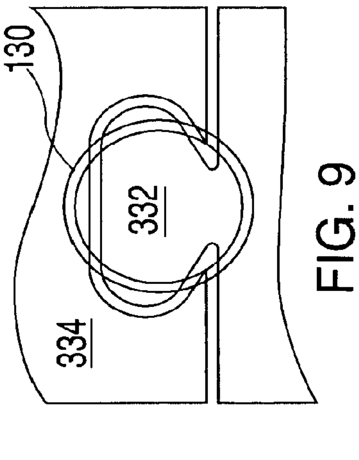
Figure 10:
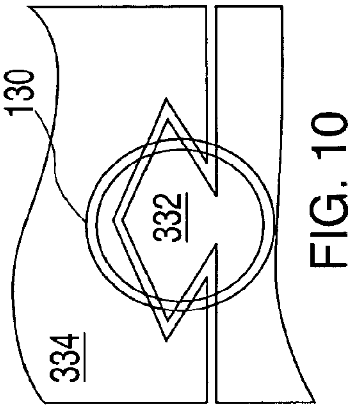
FIG. 10 is a partial view of another alternative embodiment of mating dovetails of FIGS. 8 and 9 having four sides and swaged with a circle punch profile illustrating six swage contact points across the interface of the mating dovetails.

Referring now to FIGS. 7 and 8, a comparison between a "cross pattern" punch profile vs. a circle punch profile is illustrated. FIG. 7 illustrates a "cross patterned" punch profile generally at 300 across interlocking coplanar dovetail features 130 including a three sided dovetail 332 and a complementary configured three sided receptacle 334. The cross pattern punch profile 300 provides three swage contact points 340. FIG. 8 illustrates a "circle" punch profile 350 generally across interlocking coplanar dovetail features 130 including three sided dovetail 332 and complementary configured three sided receptacle 334. The circle punch profile 350 provides twice as many swage contact points 340 (i.e., six) corresponding with the hollow circle punch intersecting interface 130 at these six points. Although a three sided dovetail has been described and illustrated, it will be recognized by one skilled in the pertinent art that an ovalized dovetail (See FIG. 9) or polygonal dovetail having more than three sides (e.g., four or more, see FIG. 10) is also contemplated. In each case, a generously radiused dovetail is contemplated with a hollow circle punch to be used for swaging. It will also be recognized that the alternative embodiments illustrated in FIGS. 9 and 10 both provide six swaging contact points.

In this manner, retention in an x and y directions is seen as at least doubled compared with the cross pattern punch profile illustrated in FIG. 7 because the circle punch profile provides twice the edge swaging contact points (i.e., 6 vs. 3). Accordingly, a stronger bond results without welding, thus eliminating touch-up to cover burn marks associated with welding. The circular punch profile enhances the bond by distributing the load more uniformly around the generously radiused dovetail features.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for fastening two substantially coplanar edges without a weld, the method comprising:

configuring an interfacing feature, having a selected shape, on a first edge;

configuring a complementary interfacing feature receptacle, having a selected complimentary shape which complements the selected shape of the interfacing feature, on a second edge to receive said interfacing feature therein;

disposing said interfacing feature within said complementary interfacing receptacle; and swaging an interface defined between said interfacing feature in said first edge and said complementary interfacing feature in said second edge to swage mating edges defining said selected shape and said selected complimentary shape at least six swage contact points, wherein said first and second edges include edges of sides defining one of a tail stock bezel and an air filler book assembly.

2. The method of claim 1, wherein said swaging is accomplished with a hollow circle punch.

3. The method of claim 1, wherein said interface between said interfacing feature and complementary interfacing receptacle includes a space therebetween which is provided before said swaging.

4. The method of claim 1, wherein said first and second edges are edges provided from one of a same substrate or different substrates to be joined.

5. A method for fastening two substantially coplanar edges without a weld, the method comprising:

configuring an interfacing feature, having a selected shape, on a first edge;

configuring a complementary interfacing feature receptacle, having a selected complimentary shape which complements the selected shape of the interfacing feature, on a second edge to receive said interfacing feature therein;

disposing said interfacing feature within said complementary interfacing receptacle; and swaging an interface defined between said interfacing feature in said first edge and said complementary interfacing feature in said second edge to swage mating edges defining said selected shape and said selected complimentary shape at least six swage contact points, wherein said first and second edges are edges provided from a same substrate.

6. A method for fastening two substantially coplanar edges without a weld, the method comprising:

configuring an interfacing feature, having a selected shape, on a first edge;

configuring a complementary interfacing feature receptacle, having a selected complimentary shape which complements the selected shape of the interfacing feature, on a second edge to receive said interfacing feature therein;

disposing said interfacing feature within said complementary interfacing receptacle; and swaging an interface defined between said interfacing feature in said first edge and said complementary interfacing feature in said second edge to swage mating edges defining said selected shape and said selected complimentary shape at least six swage contact points, wherein said swaging is with a hollow circle punch which distributes a load experienced by a resulting mechanical joint interface more uniformly relative to cross pattern swaging, and wherein said swaged interface eliminates at least one of a weld pad area and touch-up associated with a resulting mechanical joint interface between said first and second edges.

* * * * *